(12) United States Patent
Yearsley

(10) Patent No.: US 8,244,994 B1
(45) Date of Patent: *Aug. 14, 2012

(54) COOPERATING MEMORY CONTROLLERS THAT SHARE DATA BUS TERMINALS FOR ACCESSING WIDE EXTERNAL DEVICES

(75) Inventor: Gyle D. Yearsley, Boise, ID (US)

(73) Assignee: IXYS CH GmbH (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/317,674

(22) Filed: Oct. 25, 2011

Related U.S. Application Data

(63) Continuation of application No. 12/319,775, filed on Jan. 12, 2009, now Pat. No. 8,074,033.

(51) Int. Cl.
  *G06F 12/00* (2006.01)
(52) U.S. Cl. ............ 711/154; 711/103; 711/168; 710/5; 710/8; 710/20; 710/21
(58) Field of Classification Search .................. 711/154, 711/103, 168; 710/5, 8, 20, 21
  See application file for complete search history.

(56) References Cited

U.S. PATENT DOCUMENTS

| | | | |
|---|---|---|---|
| 5,748,977 A | 5/1998 | Kawasaki et al. | 712/33 |
| 6,154,793 A | 11/2000 | MacKenna et al. | 710/23 |
| 6,480,929 B1 | 11/2002 | Gauthier et al. | 711/105 |
| 6,981,077 B2 | 12/2005 | Modelski et al. | 710/100 |
| 7,073,035 B2 | 7/2006 | Ware et al. | 711/154 |
| 7,146,469 B2 | 12/2006 | Watanabe | 711/141 |
| 7,366,828 B2 | 4/2008 | Sakurai | 711/106 |
| 7,428,603 B2 * | 9/2008 | Henson et al. | 710/22 |
| 2002/0116587 A1 | 8/2002 | Modelski et al. | 711/154 |
| 2003/0181994 A1 | 9/2003 | Mizoguchi | 700/2 |
| 2009/0259789 A1 | 10/2009 | Kato et al. | 710/308 |

OTHER PUBLICATIONS

"AU-SS3000: SDRAM/SRAM/Flash Controller AMBA Subsystem Core", Aurora VLSI, downloaded from www.auroravlsi.com on Jan. 6, 2009; pp. 1-7.

* cited by examiner

*Primary Examiner* — Stephen Elmore
(74) *Attorney, Agent, or Firm* — Imperium Patent Works; T. Lester Wallace

(57) ABSTRACT

A memory controller mechanism is operable in a first mode and a second mode. In the first mode, a first memory controller portion of the mechanism can use a first set of data terminals to perform a first external bus access operation (EBAO) and a second memory controller portion of the mechanism can use a second set of data terminals to perform a second EBAO. The first and second EBAO operations may be narrow accesses that occur simultaneously. In the second mode, one of the controllers can use both the first and second sets of data terminals to perform a wider third EBAO. The memory controller mechanism can dynamically switch between first mode and second mode operations. In situations in which one of the sets of data terminals would not otherwise be used, performing wide accesses in the second mode using the one set of data terminals improves bus utilization.

20 Claims, 4 Drawing Sheets

COOPERATING MEMORY CONTROLLERS THAT SHARE DATA BUS TERMINALS FOR ACCESSING WIDE EXTERNAL DEVICES

CROSS REFERENCE TO RELATED APPLICATION

This application is a continuation of, and claims priority under 35 U.S.C. §120 from, nonprovisional U.S. patent application Ser. No. 12/319,775 entitled "Cooperating Memory Controllers that Share Data Bus Terminals for Accessing Wide External Devices," filed on Jan. 12, 2009, now U.S. Pat. No. 8,074,033, the subject matter of which is incorporated herein by reference.

TECHNICAL FIELD

The described embodiments relate to memory controllers.

BACKGROUND INFORMATION

In a class of integrated circuits referred to here as general purpose microcontrollers, a single microcontroller integrated circuit design is generally to be used by many different customers in many different applications. Due to the different customers and applications, it is often the case that the same microcontroller integrated circuit design is to be usable with many different types and/or sizes of memory devices. Such general purpose microcontrollers therefore may include configurable on-chip memory controllers. By appropriate configuring of an on-chip memory controller, the memory controller can be made to interface to a selected one of many different memory types, memory sizes, and memory bus configurations.

FIG. 1 (Prior Art) is a diagram of a part of one conventional microcontroller integrated circuit design. Microcontroller 1 involves a processor 2, a local bus 3, two memory controllers 4 and 5, as well as other circuits not illustrated. Processor 2 can access external memory devices 6 and 7 across a first data bus 8. Processor 2 can also access external memory devices 9 and 10 across a second data bus 11. Because the data buses 8 and 11 are separate, and because two memory controllers 4 and 5 are coupled to the buses as illustrated, memory controller 4 can perform an access across data bus 8 at the same time that memory controller 5 can perform an access across data bus 11. Memory controllers 4 and 5 may, for example, be of identical construction and may have identical capabilities. Such memory controllers are often configurable by the processor so that the microcontroller integrated circuit can use data buses of a selected one of several different widths to interface to external memory devices. Depending on the width of a data bus coupled to various terminals associated with memory controller 4, memory controller 4 can provide a data bus interface of, for example, sixteen bits, twenty-four bits, or thirty-two bits. In this example illustrated in FIG. 1, however, all memory devices on a particular data bus are of the same sixteen bit data width.

FIG. 2 (Prior Art) is a diagram of another conventional design. In this case, a microcontroller 12 can, in a given external bus operation, access either memory device 13 or memory device 14. Memory device 13 stores data words of a relatively narrow width (for example, each memory location is sixteen bits as illustrated), whereas memory device 14 stores data words of a relatively wide width (for example, each memory location is thirty-two bits as illustrated). If memory device 13 is being accessed, then only sets 15 and 16 of data conductors and sets 17 and 18 of data terminals are employed to communicate 16-bit words of data between microcontroller 12 and memory device 13. Sets 19 and 20 of data conductors and sets 21 and 22 of data terminals are not needed or used for such accesses. If, however, wide memory device 14 is being accessed, then all sets 15, 16, 19 and 20 of data conductors are used and all sets 17, 18, 21 and 22 of data terminals are employed to communicate 32-bit words of data between microcontroller 12 and memory device 14. How many of the data conductors and data terminals are used depends on the memory location that processor 23 is attempting to access. If the memory location is in memory device 13, then fewer than all of the data bus conductors and data terminals are employed as appropriate, whereas if the memory location is in memory device 14, then all of the data bus conductors and data terminals are employed. An alternative and/or improved microcontroller, memory controller and memory architecture is desired.

SUMMARY

A system includes an integrated circuit, a plurality of external devices, and a plurality of data bus conductors. The data bus conductors couple the external devices to the integrated circuit. The plurality of external devices may, for example, be memory devices and peripheral devices. The integrated circuit may, for example, be a microcontroller integrated circuit that includes a novel memory controller mechanism and an associated plurality of terminals.

The novel memory controller mechanism is operable in a first mode and a second mode. In the first mode, a first memory controller portion of the mechanism can use a first set of the data terminals to perform a first external bus access operation (EBAO). Also in the first mode, a second memory controller portion of the mechanism can use a second set of data terminals to perform a second EBAO. The first and second EBAO operations may be relatively narrow accesses that occur simultaneously. The first and second memory controller portions can use their respective data bus conductors relatively independently of one another in the first mode.

In the second mode, one of the memory controller portions can use both the first and second sets of data terminals to perform a wider third EBAO. The memory controller mechanism can be made to switch dynamically between performing accesses in the first mode and performing accesses in the second mode. In situations in which one of the sets of data terminals would not otherwise be used, performing wide accesses in the second mode results in the use of the one set of data terminals and results in an advantageous increase in external memory data bus bandwidth and external memory data bus utilization.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
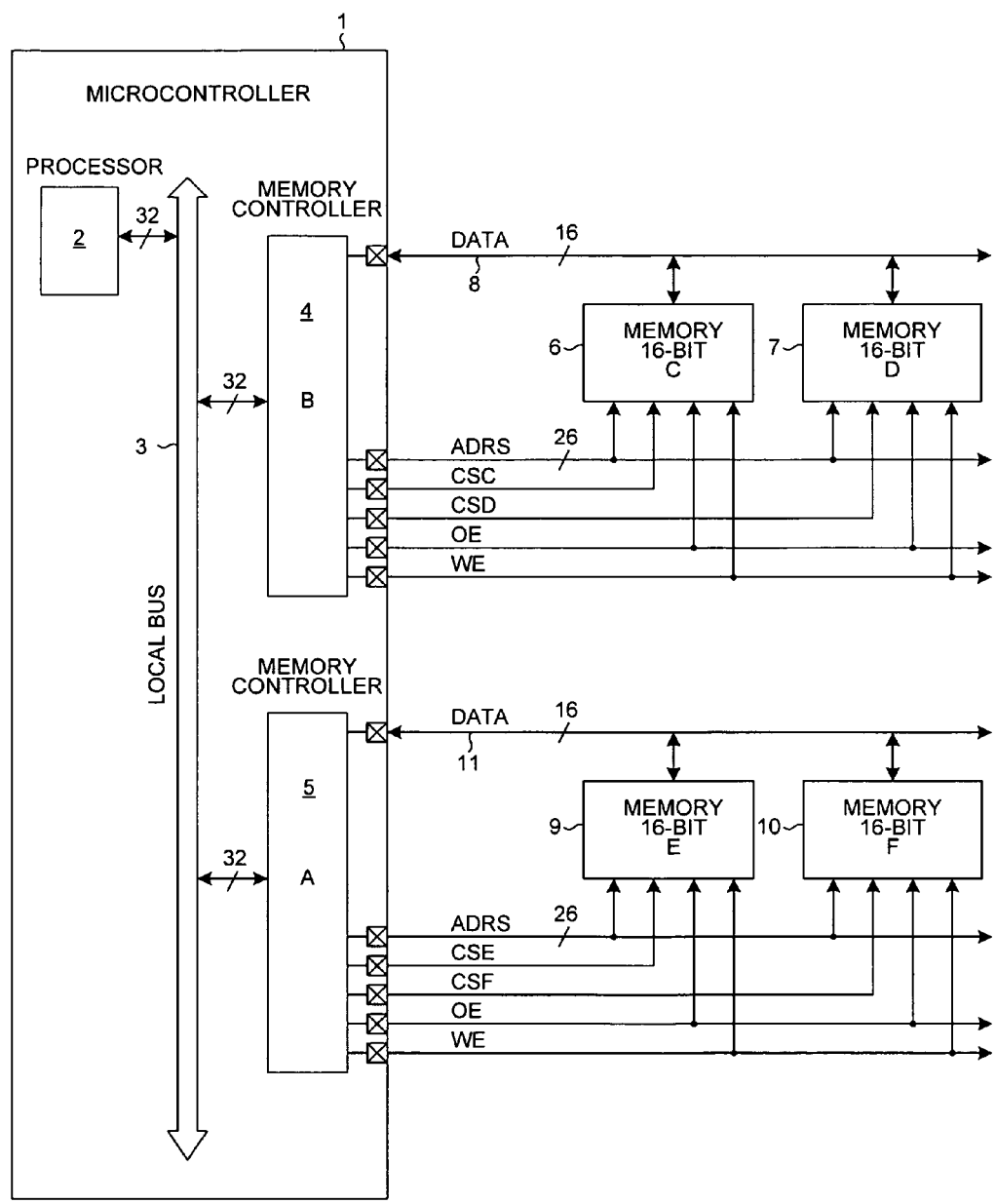
FIG. 1 (Prior Art) is a diagram of an integrated circuit that includes a pair of independent memory controllers.
Figure 2:
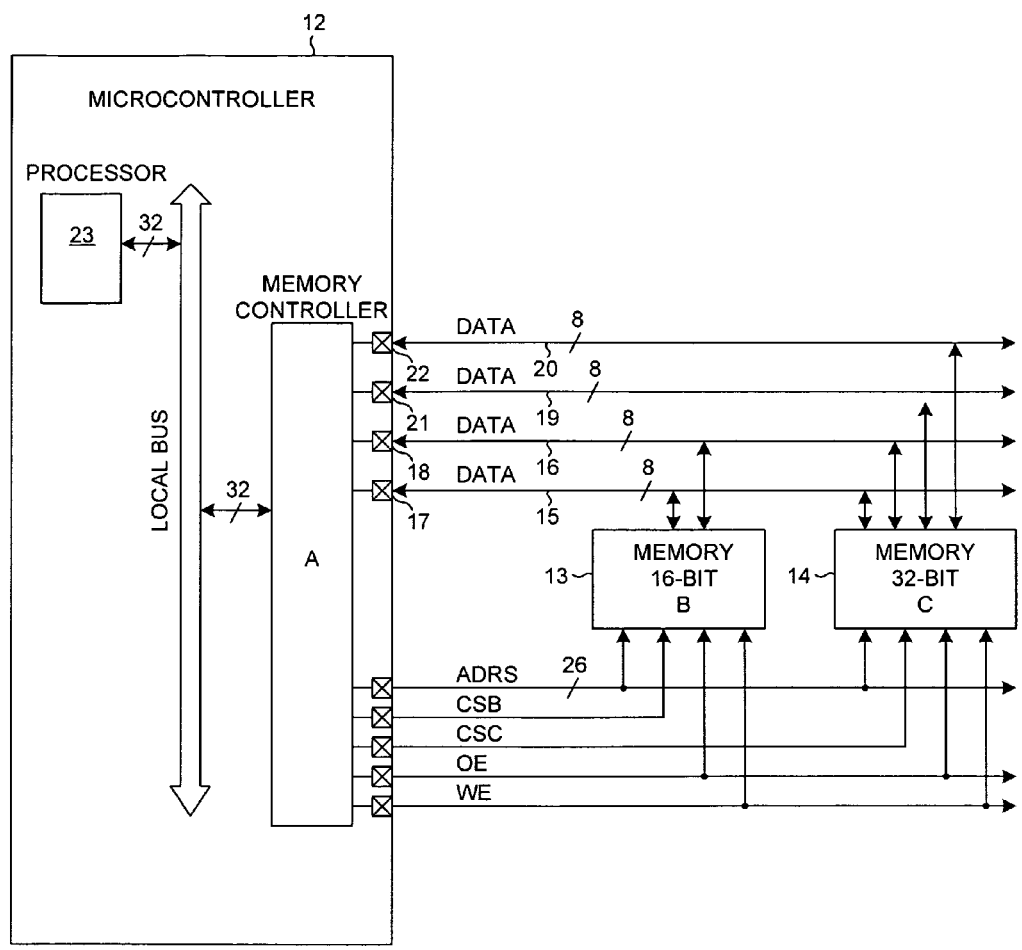
FIG. 2 (Prior Art) is a diagram of an integrated circuit involving a memory controller that performs external bus accesses of different data bus widths.
Figure 3:
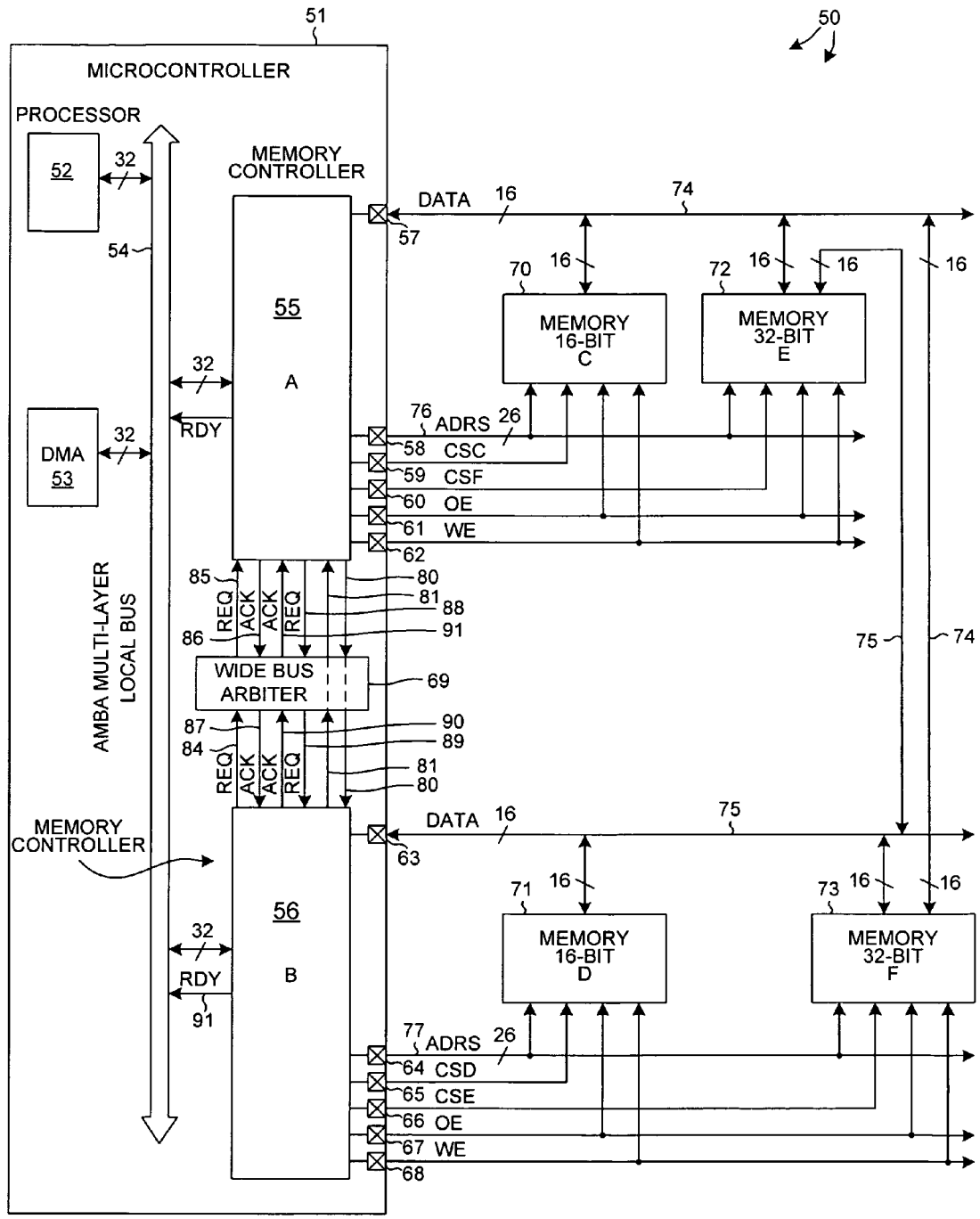
FIG. 3 is a diagram of a system 50 in accordance with one novel aspect. System 50 includes a microcontroller integrated circuit 51 having a novel memory controller mechanism including parts identified by reference numerals 55, 56, 69, 84, 85, 86, 87, 88, 89, 90, 91, 80, 81, 57, 63. The novel memory controller mechanism can perform multiple narrow external bus accesses in a first mode, where one of the narrow external bus accesses uses a first set of data bus terminals/conductors, and where the other of the narrow external bus accesses uses a second set of data bus terminals/conductors. The memory controller mechanism can also perform wider external bus accesses in a second mode. In a wider external bus access both the first and second sets of data bus terminals/conductors are used in the same one wider external bus access.

FIG. 3 is a simplified block diagram of a microcontroller and memory system 50 in accordance with one novel aspect. Microcontroller integrated circuit 51 includes, among other parts not illustrated, a processor 52, a Direct Memory Access (DMA) controller 53, an AMBA multi-layer local bus 54, a first memory controller 55, a second memory controller 56, a circuit referred to as a "wide bus arbiter" 69, and a plurality of terminals. Processor 52 executes a set of instructions (a program) stored in a processor-readable medium (for example, SRAM or ROM or FLASH). The processor-readable medium (not illustrated) either is disposed on the microcontroller integrated circuit 51 or is disposed external to the microcontroller integrated circuit. The plurality of terminals includes a first set 57 of data terminals, a first set 58 of address terminals, a plurality of chip select terminals including CSC terminal 59 and CSF terminal 60, an output enable OE terminal 61 and a write enable WE terminal 62. These terminals may have other uses in other memory controller configurations. The terms "data terminals" and "address terminals" and so forth are used here as labels to distinguish one set of terminals from another in the particular configurations being described.

In addition to these terminals, microcontroller integrated circuit 51 includes a second set 63 of data terminals, a second set 64 of address terminals, a plurality of chip select terminals including CSD terminal 65 and CSE terminal 66, an output enable OE terminal 67 and a write enable WE terminal 68. System 50, in addition to microcontroller 51, includes a first memory device 70, a second memory device 71, a third memory device 72, a fourth memory device 73, a first set 74 of data conductors, a second set 75 of data conductors, and other conductors as illustrated.

Processor 52 can configure each of the memory controllers 55 and 56 under software/firmware control by writing configuration information across bus 54 into configuration registers (not shown) in the memory controllers. Each of the memory controllers may, for example, be configured to provide appropriate interface and control signals for maintaining and accessing external devices such as Synchronous Dynamic Random Access Memory (SDRAM) memory devices, Static Random Access Memory (SRAM) memory devices, NAND FLASH memory devices, NOR FLASH memory devices, and peripheral devices. Examples of possible peripheral devices that are accessed by memory controllers include USB peripherals, ethernet peripherals, SDIO peripherals, and external UART devices. In addition to the terminals and associated data and control bus conductors illustrated, the memory controllers 55 and 56 also control other terminals and conductors to support interfacing with the particular type or types of memory devices employed in system 50. Such additional terminals and conductors are not illustrated in FIG. 3 so as not to obscure illustration of the terminals and conductors that are more involved in the novel functionality described. In one example, the functions of the memory controllers are described in a hardware description language, and then the hardware description language description is synthesized using a commercially available sythesis tool into a hardware circuit design, and then the resulting hardware circuit design is then fabricated into an integrated circuit.

First Operating Mode:

In a first operating mode, memory controller 55 can access memory device 70 across 16-bit wide data bus, data terminals 57, and data conductors 74. If, for example, processor 52 were to write a 32-bit data word into memory 70, then processor 52 writes the 32-bit data word across local bus 54 into memory controller 55. Memory controller 55 is configured such that memory controller 55 responds by performing two consecutive 16-bit writes across 16-bit wide data bus conductors 74 into two 16-bit memory locations in memory device 70. The addresses of the locations to which the data words are written are determined by addresses placed on the ADRS conductors 76 by memory controller 55. The first of these two 16-bit memory accesses is referred to here as the first external bus access operation (EBAO).

At the same time that memory device 70 is being accessed in the first EBAO, the second memory controller 56 can access second memory device 71 across data terminals 63 and the 16-bit wide data bus conductors 75. Memory controller 56 may access memory device 71 in the same way that memory controller 55 accesses memory device 70. In the first mode, the 16-bit wide accessing of memory devices 70 and 71 can occur simultaneously. In one example, processor 52 is a first master on AMBA bus 54 and DMA controller 53 is a second master on AMBA bus 54. First memory controller 55 is a first slave on AMBA bus 54 and second memory controller 56 is a second slave on AMBA bus 54. Because AMBA bus 54 in this example is a multi-layer bus, one of the masters can perform a 32-bit bus operation with a selected one of the slaves at the same time that the other master performs another 32-bit bus operation with the other slave. In the example of the first operational mode described here, first memory controller 55 performs the first 16-bit EBAO with first memory device 70 across sixteen data conductors 74 at the same time that second memory controller 56 performs a second 16-bit EBAO with second memory device 71 across sixteen data conductors 75. The first and second memory controllers 55 and 56 perform their respective first mode narrow EBAOs substantially independently of one another.

Second Operating Mode:

In a second operating mode, one of the memory controllers can perform a wide access of a wide memory device by utilizing some or all of the data conductors normally used by the other memory controller in the first operating mode. In the example of FIG. 3, second memory controller 56 may perform a 32-bit wide EBAO (a third EBAO in this example) of 32-bit wide memory device 73 by using both the sixteen data conductors 75 as well as the sixteen data conductors 74. If, for example, the third EBAO is a 32-bit wide read operation, then processor 52 performs a read of second memory controller 56 across bus 54. Second memory controller 56 has not yet obtained the requested data from a memory, so second memory controller 56 holds bus 54 in a wait mode using the ready RDY bus line 91. Memory controller 56 then asserts a request signal REQ on conductor 84. This request signal is communicated through conductors 84 and 85 and wide bus arbiter 69 to first memory controller 55. This request signal is a request to use data terminals 57 and data conductors 74 in a second mode bus access. When first memory controller 55 is no longer using data terminals 57 and data conductors 74, first memory controller 55 suspends its future possible use of terminals 57 and conductors 74 and returns an acknowledgement signal ACK to second memory controller 56 via conductors 86 and 87 and wide bus arbiter 69.

Figure 4:
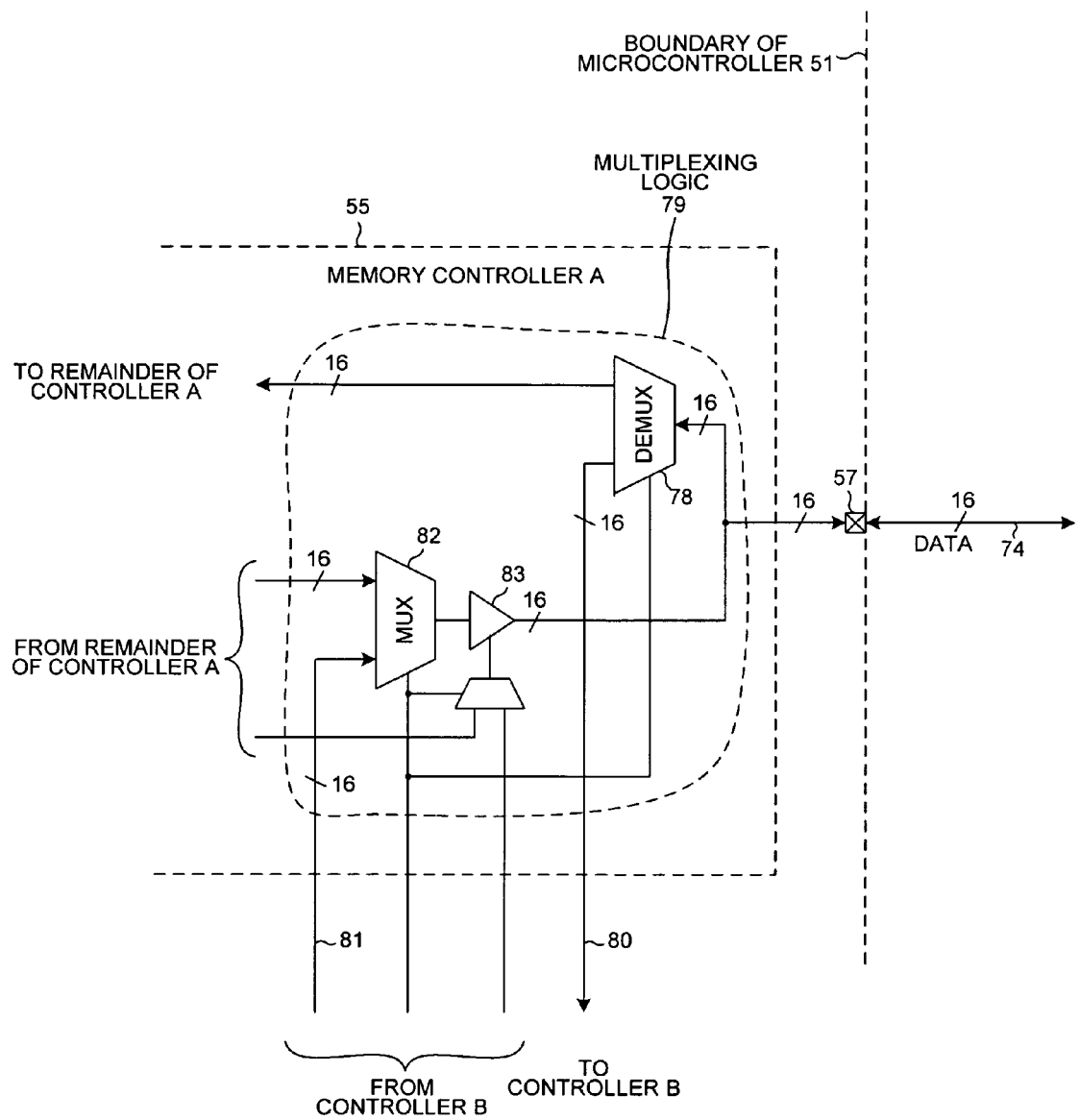
FIG. 4 is a simplified diagram that illustrates one example of multiplexing logic that is incorporated into a memory controller of FIG. 3 to enable the other memory controller to use its data terminals in the second mode. Both memory controllers in FIG. 3 include identical such multiplexing logic circuits.

When second memory controller 56 receives the acknowledgement signal ACK, memory controller 56 places a 26-bit address of the 32-bit memory location to be read on ADRS conductors 77. Second memory controller 55 asserts appropriate chip select signals on chip select terminals 64 and 65 such that memory device 71 is not selected and such that memory device 73 is selected. When second memory controller 56 asserts the output enable (OE) signal on terminal 66, then 32-bit wide memory device 73 outputs the addressed 32-bit data value. The first sixteen least significant bits of the 32-bit value are output by memory device 73 onto data conductors 75. Second memory controller 56 reads these sixteen data values via sixteen data terminals 63. The sixteen most significant bits of the 32-bit value are, however, output by memory device 73 onto data conductors 74. Note that in FIG. 3, data conductors 74 extend to 32-bit memory device 73. This most significant sixteen bits of data is read into the second memory controller 56 via sixteen data conductors 74, sixteen data terminals 57, and demultiplexers 78 (see FIG. 4) in multiplexing logic 79 in first memory controller 55, and data conductors 80, back to second memory controller 55. The resulting thirty-two bits of read data is then communicated from second memory controller 56 back to processor 52 as one 32-bit data value across bus 54. To complete the bus transaction on bus 54, second memory controller 56 releases the RDY signal on conductor 91. Second memory controller 56 no longer needs to reserve the use of terminals 57 and conductors 74, so second memory controller 56 deasserts the request signal REQ on conductor 84. This event is communicated to first memory controller 55 via conductors 84 and 85 and wide bus arbiter 69. When first memory controller 55 detects the deassertion of the REQ signal, then memory controller 55 again assumes control of terminals 57 and conductors 74 and deasserts the ACK signal, which in turn is communicated back to the second memory controller 56 via conductors 86 and 87 and wide bus arbiter 69.

Request conductors 84 and 85 and acknowledgement conductors 86 and 87 are provided for situations in which the second memory controller 56 is to take control of and use terminals 57 and conductors 74 in a wide second mode EBAO in which second memory controller 66 supplies the address on ADRS conductors 77 as described above. The memory system in this example is, however, symmetrical in that the first memory controller 55 is also able to perform wide second mode memory accesses. Request conductors 88 and 89 and acknowledgement conductors 90 and 91 are therefore provided for situations in which first memory controller 55 is to take control of and use terminals 63 and conductors 75 in a wide second mode EBAO. Due to the required usage of all of data conductors 74 and 75 in the performing of a single 32-bit wide EBAO, only one of the memory controllers 55 and 56 can perform a 32-bit wide EBAO at a given time.

In a contention situation, wide bus arbiter 69 determines which one of multiple requesting memory controllers will be given control of the data terminals and associated data conductors of a given other memory controller. Although in the example illustrated in FIG. 3 there are only two memory controllers, the shared data bus architecture of FIG. 3 is extendable to involve three or more cooperating memory controllers that can share each others data terminals to perform wide external bus accesses.

A situation is described above in which the third EBAO is a 32-bit read operation. If the third EBAO is a write operation, then processor 52 writes the 32-bit data value across bus 54 and into second memory controller 56. After requesting use of terminals 57 and conductors 74 and being granted use of terminals 57 and conductors 74 as explained above, the second memory controller 55 places the address of the 32-bit memory location to be written on ADRS conductors 77. Second memory controller 56 asserts appropriate chip select signals on chip select terminals 65 and 66 such that memory device 71 is not selected and such that memory device 73 is selected. Second memory controller 56 places the least significant sixteen bits of the 32-bit value to be written onto sixteen data conductors 75. Second memory controller 56 places the most significant sixteen bits of the 32-bit value to be written onto data conductors 74. This most significant sixteen bits of data passes from second memory controller 56, across data conductors 81, through multiplexers 82 (see FIG. 4) and tri-state buffers 83 onto data terminals 57, and onto data conductors 74, and to memory device 73. When all 32-bits of data is set up on the data terminals of memory device 73, then second memory controller 56 asserts the write enable strobe signal WE on terminal 68 thereby writing the 32-bits of data into memory device 73.

In one advantageous aspect, operation of the memory controllers can be made to switch dynamically over time from one or more 16-bit wide access operations in the first mode to a 32-bit wide access operation in the second mode, and back again, from memory access to memory access. In the particular memory device topology of FIG. 3, first memory controller 55 can perform 32-bit wide accesses of memory device 72 and second memory controller 56 can perform 32-bit accesses of memory device 73. Due to the required usage of all of conductors 74 and 75 in the performing of a single 32-bit wide access, only one of the wide memory devices 72 and 73 can be accessed at a time. In operation in the first mode, on the other hand, memory controller 55 can access memory device 70 at the same time that memory controller 56 accesses memory device 71.

Although certain specific embodiments are described above for instructional purposes, the teachings of this patent document have general applicability and are not limited to the specific embodiments described above. A requesting memory controller's use, in the second operating mode, of data terminals and data conductors of another memory controller can be extended such that a requesting memory controller can use, in the second operating mode, data terminals and data conductors of multiple other memory controllers. In a memory controller mechanism involving three or more memory controllers, some of the memory controllers can be operating in the first mode (no data bus sharing) while others of the memory controllers are operating in the second mode (data bus sharing). The first set of data terminals may, in certain operating modes of the integrated circuit, not be used for memory controller purposes but may, for example, be configurable to function as general purpose input/output terminals. Similarly, the second set of data terminals may, in certain operating modes of the integrated circuit, not be used for memory controller purposes but may, for example, be configurable to function as general purpose input/output terminals. Rather than the usage of a set of bus conductors in the first mode by a first memory controller for a narrow bus access and the use of the same set of bus conductors in the second mode by a second memory controller for a wide bus access being simple parallel bus accesses, one or the accesses may involve more complex protocols to communicate data between the memory controllers and the memory devices. Of importance, a first memory controller's bus conductors that would otherwise be unused during a period of time in the prior art are now used by another memory controller to increase memory bus bandwidth, such as by allowing the other memory controller to perform a wide bus access. Accordingly, various modifications, adaptations, and combinations of various features of the described embodiments can be practiced without departing from the scope of the invention as set forth in the claims.

What is claimed is:

1. An integrated circuit comprising:
a first set of M data terminals;
a second set of N data terminals;
a first memory controller that communicates M bits of data in parallel across the first set of M data terminals in a first external bus access operation (EBAO); and
a second memory controller that communicates N bits of data in parallel across the second set of N data terminals in a second EBAO, wherein the first EBAO does not involve communicating data across the second set of N data terminals, wherein the second EBAO does not involve communicating data across the first set of M data terminals, wherein the first EBAO and the second EBAO occur simultaneously, and wherein the first and second memory controllers are operable together in a third EBAO to communicate M+N bits in parallel across the first set of M data terminals and the second set of N data terminals.

2. The integrated circuit of claim 1, further comprising:
a first set of address terminals usable by the first memory controller to communicate a first address in the first EBAO; and
a second set of address terminals usable by the second memory controller to communicate a second address in the second EBAO.

3. The integrated circuit of claim 1, wherein the integrated circuit is a microcontroller that includes a processor, and wherein the processor can write to and read from the first memory controller across a local bus.

4. The integrated circuit of claim 1, further comprising:
a local bus coupled to the first memory controller; and
a processor that can write to and read from the first memory controller across the local bus.

5. The integrated circuit of claim 4, wherein in the third EBAO the first memory controller and the second memory controller are controllable by the processor to write M+N bits in parallel simultaneously across the first set of M data terminals and the second set of N data terminals.

6. The integrated circuit of claim 4, wherein the processor writes M bits of data into the first memory controller and N bits of data into the second memory controller across the local bus in one local bus write operation, wherein the processor controls the first memory controller to write M bits across the first set of M data terminals in a first write operation, and wherein the processor controls the second memory controller to write N bits across the second set of N data terminals in a second write operation.

7. The integrated circuit of claim 1, further comprising:
a local bus; and
a processor that configures the first memory controller by writing configuration information across the local bus into configuration registers in the first memory controller.

8. The integrated circuit of claim 1, further comprising:
a communication mechanism through which the first memory controller communicates with the second memory controller such that in the third EBAO the second memory controller is made to operate along with the first memory controller.

9. The integrated circuit of claim 1, wherein the first memory controller performs the first EBAO and the second memory controller performs the second EBAO substantially independently of one another.

10. The integrated circuit of claim 1, wherein M equals N, wherein the first memory controller is operable to perform EBAOs of a selectable one of the following data bus widths: M, M/2 and M/4, and wherein the second memory controller is operable to perform EBAOs of a selectable one of the following data bus widths: N, N/2 and N/4.

11. A method comprising:
performing a first relatively narrow M data bit wide access operation of a first memory device via a first set of M data conductors;
performing a second relatively narrow N data bit wide access operation of a second memory device via a second set of N data conductors, wherein the M data conductors are coupled to the first memory device and to a third memory device, and wherein the N data conductors are coupled to the second memory device and to the third memory device, and wherein the first relatively narrow M data bit wide access operation and the second relatively narrow N data bit wide access operation are performed simultaneously; and
performing a third relatively wide M+N data bit wide access operation of the third memory device by using both the first set of M data conductors and the second set of N data conductors to communicate M+N data bits in parallel between the third memory device and an integrated circuit.

12. The method of claim 11, wherein the integrated circuit can dynamically switch between: 1) performing relatively wide M+N data bit wide access operations of the third memory device using the M data conductors and the N data conductors, and 2) performing relatively narrow data bit wide access operations of the first and/or second memory devices using the M and/or N data conductors.

13. The method of claim 11, wherein the performing the first relatively narrow M data bit wide access involves communicating M bits of data across a first set of terminals of the integrated circuit such that the M bits of data are communicated in parallel between the integrated circuit and the first memory device.

14. The method of claim 11, wherein the performing the third relatively wide M+N data bit wide access involves communicating M+N bits of data across both a first set of M terminals and a second set of N terminals of the integrated circuit such that the M+N bits of data are communicated in parallel between the integrated circuit and the third memory device.

15. The method of claim 11, wherein a memory controller mechanism switches dynamically between performing the third relatively wide M+N data bit wide access operation of the third memory device and performing one or more relatively narrow data bit wide access operations of one or both of the first and second memory devices.

16. An integrated circuit comprising:
a first set of M terminals;
a second set of N terminals;
a first memory interface that performs an M bit wide access operation across the first set of M terminals; and a second memory interface that performs an N bit wide access operation across the second set of N terminals simultaneously with the M bit wide access operation across the first set of M terminals, wherein the second memory interface also communicates M+N bits of data simultaneously in parallel across both the first set of M terminals and the second set of N terminals.

17. The integrated circuit of claim 16, wherein each of the first and second memory interfaces is configurable to operate as a selectable one taken from the group consisting of: a synchronous dynamic random access memory (SDRAM) memory controller interface, a static random access memory (SRAM) memory controller interface, a NAND FLASH memory controller interface, a NOR FLASH memory controller interface, and a peripheral device interface.

18. The integrated circuit of claim 16, wherein the first and second memory interfaces switch dynamically between performing M bit wide access operations, N bit wide access operations, and M+N bit wide access operations.

19. The integrated circuit of claim 16, wherein the M bit wide access operation is an external bus access operation.

20. The integrated circuit of claim 16, wherein the integrated circuit is a microcontroller that includes a processor, and wherein the processor can write to and read from the first memory controller across the local bus.

* * * * *